(12) United States Patent
Peter

(10) Patent No.: US 7,527,313 B2
(45) Date of Patent: May 5, 2009

(54) CABLE-OPERATED SLIDE-OUT FOR RECREATIONAL VEHICLE

(75) Inventor: Gary D. Peter, Middlebury, IN (US)

(73) Assignee: Actuant Corporation, Glendale, WI (US)

( * ) Notice: Subject to any disclaimer, the term of this patent is extended or adjusted under 35 U.S.C. 154(b) by 349 days.

(21) Appl. No.: 11/557,784

(22) Filed: Nov. 8, 2006

(65) Prior Publication Data

US 2007/0164580 A1    Jul. 19, 2007

Related U.S. Application Data

(60) Provisional application No. 60/734,497, filed on Nov. 8, 2005.

(51) Int. Cl.
*B60P 3/34* (2006.01)
(52) U.S. Cl. ............... 296/26.12; 296/26.01; 296/26.13
(58) Field of Classification Search .............. 296/26.01, 296/26.08, 26.09, 26.12, 26.13
See application file for complete search history.

(56) References Cited

U.S. PATENT DOCUMENTS

| | | |
|---|---|---|
| 1,972,415 A | 9/1934 | Anderson |
| 3,494,655 A | 2/1970 | Linton |
| 3,608,954 A | 9/1971 | Lynd |
| 5,758,918 A | 6/1998 | Schneider et al. |
| 6,254,171 B1 | 7/2001 | Young, Sr. |
| 6,623,066 B2 | 9/2003 | Garceau et al. |
| 6,644,719 B2 | 11/2003 | Young, Sr. |
| 7,360,815 B2 * | 4/2008 | Kunz et al. ............... 296/26.13 |
| 2006/0125268 A1 * | 6/2006 | Kunz ....................... 296/26.09 |
| 2008/0018130 A1 * | 1/2008 | Kunz et al. ............... 296/26.01 |

* cited by examiner

*Primary Examiner*—Lori L Lyjak
(74) *Attorney, Agent, or Firm*—Quarles & Brady LLP

(57) ABSTRACT

A cable operated slide-out mechanism for a recreational vehicle has a linear actuator mounted in a fixed channel alongside the room or compartment and an end of each cable is fixed to the channel. Four cables are provided on each side of the slide-out, with two of the cables on each side fixed to the frame on the top and going to the outside of the slide-out, on the top and bottom, and the other two cables fixed to the frame on the bottom and going to the inside of the room on the top and bottom. Pulleys are provided at each end of the actuator rod to pull on the cables so as to move the room such that the room movement is double the stroke of the actuator.

6 Claims, 4 Drawing Sheets

_US 7,527,313 B2_

CABLE-OPERATED SLIDE-OUT FOR RECREATIONAL VEHICLE

CROSS-REFERENCE TO RELATED APPLICATION

This claims the benefit of U.S. Provisional Patent Application No. 60/734,497 filed Nov. 8, 2005.

STATEMENT CONCERNING FEDERALLY SPONSORED RESEARCH OR DEVELOPMENT

Not applicable.

FIELD OF THE INVENTION

This invention relates to slide-outs for recreational vehicles.

BACKGROUND OF THE INVENTION

Slide-out rooms or compartments for recreational vehicles are well known. For example, see U.S. Pat. No. 5,758,918.

In most types of slide-outs, the slide-out operating mechanism is below the room or compartment that is to be slid out. However, in some applications there is not sufficient room beneath the room or compartment to fit a slide-out mechanism. In that case, slide-out mechanisms have been made that mount to the side of the room or compartment, on opposite sides of the room or compartment, to extend and retract the room from the vehicle. The present invention relates to this type of slide-out mechanism.

Cable-operated slide-out mechanisms operating on opposite sides of a slide-out room to extend and retract the room from the vehicle are known, but have generally been complicated and involved chains and electric motors or other heavy, problematic or expensive machine components. Therefore, improvement is needed in the area of side-mounted, cable-driven slide-outs.

SUMMARY OF THE INVENTION

The invention provides a side-mounted, cable-driven slide-out in which the prime mover of the system is a linear actuator. One linear actuator on each side of the room or compartment slackens and tensions the cables on that side to extend and retract the room. The linear actuator may be a hydraulic cylinder or an electrically-operated screw. If a cylinder, the cylinder is preferably a double-acting cylinder.

In a system of the invention, the linear actuator is preferably mounted in a fixed channel alongside the room or compartment and an end of each cable is fixed relative to the stationary frame of the recreational vehicle, for example, to the channel. Four cables are provided on each side. Two of these cables are fixed to the frame on the top and go to the outside of the room, on the top and bottom, and the other two cables are fixed to the frame on the bottom and go to the inside of the room on the top and bottom. A pulley is provided at each end of the actuator rod such that the stroke of the actuator is doubled in terms of room movement.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

The present invention provides a slide-out assembly attached to a recreational vehicle such as a trailer or motor home, which provides distinct advantages over the prior art as will be described hereafter. In the preferred embodiment, the recreational vehicle is equipped with a slide-out section, which may be a room or compartment, that is used to provide additional interior room space. However, it should be understood that the invention can also apply to expandable sections or compartments provided on other vehicles for use in construction, military, medical, education, mobile broadcast, and other applications to expand the inside volume of the vehicle.

Figure 1:
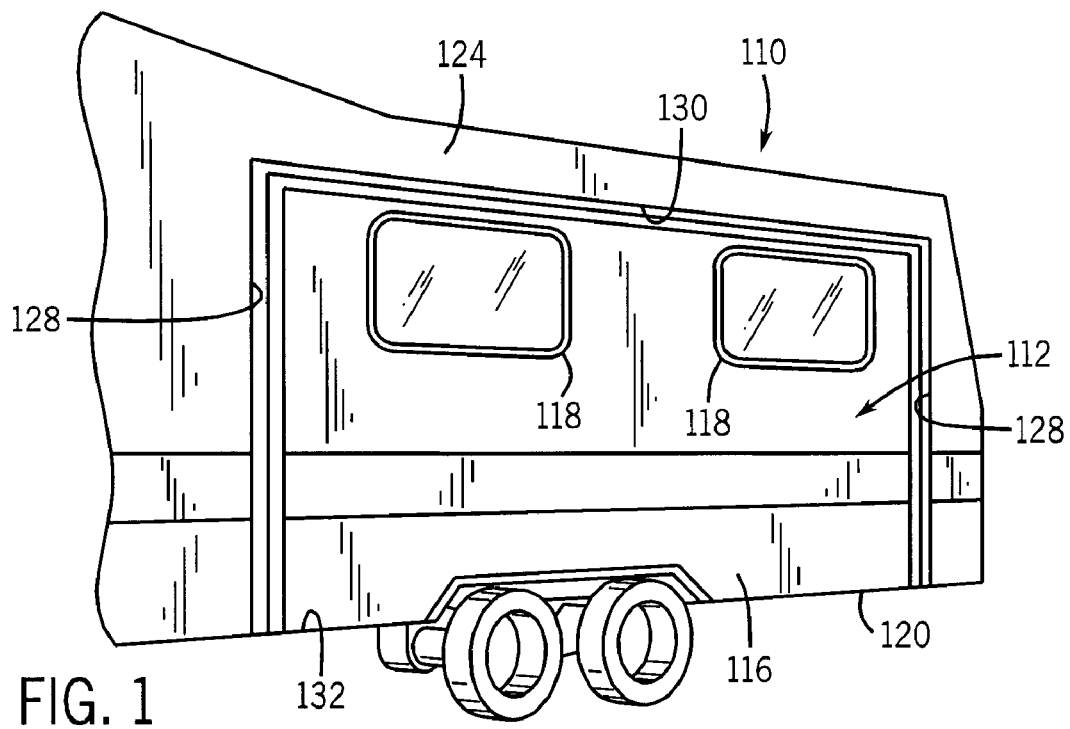
FIG. 1 is a partial, perspective view of a retracted slide-out section of a recreational vehicle utilizing a slide-out operating mechanism of the present invention.
Figure 2:
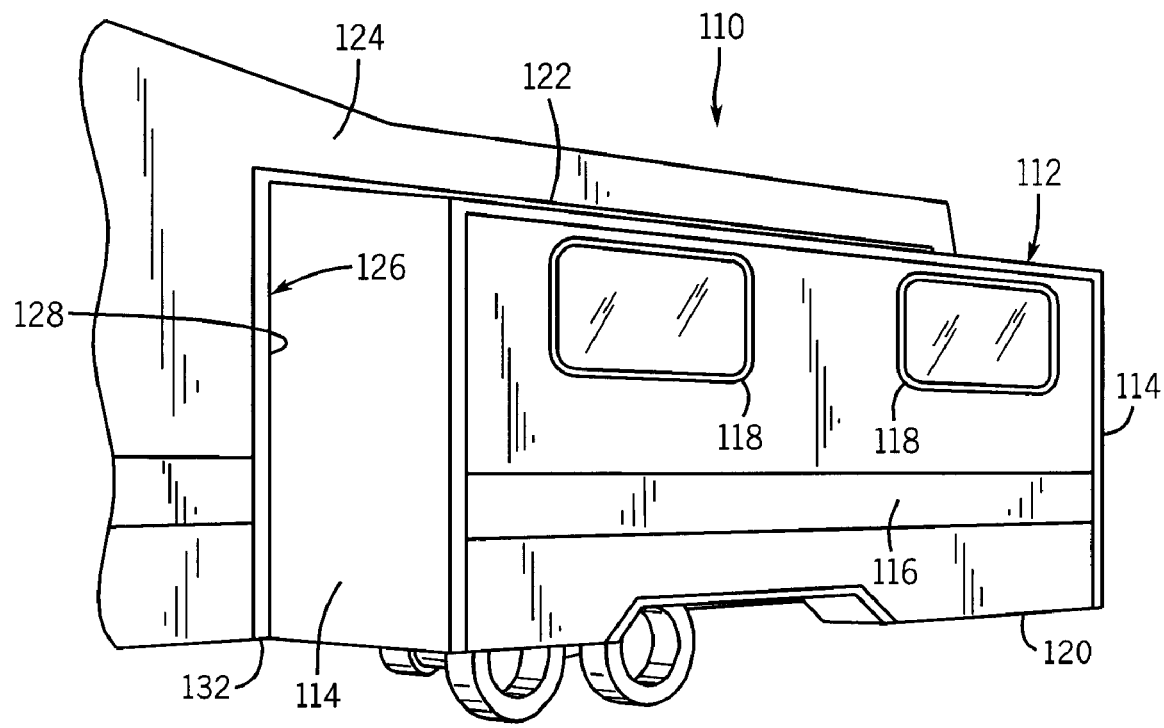
FIG. 2 is a partial, perspective view of the expanded slide-out section of the trailer or recreational vehicle of FIG. 1.

Referring to FIGS. 1 and 2, a vehicle 110 has a slide-out room 112. The slide-out room 112 has windows 110, side walls 114, outside wall 116, top wall 122 and bottom wall 120. The stationary outer wall 124 of the vehicle 110 has an opening 126 in which the slide-out section 112 is received. The opening 126 has sides 128, a top 130, and a bottom 132, which border the corresponding sides 114, top 122 and bottom 120 of the slide-out section 112. The slide-out room 112 is open on its inner side so that it is accessible from inside of the vehicle 110. As shown in FIG. 1, when the slide-out room 112 is retracted, its exterior wall 116 is substantially flush with the exterior walls of the stationary part of the vehicle 110. Elastomeric seals, such as rubber seals, are typically fixed between the slide-out section exterior wall 116 edges and the stationary opening of the vehicle 110 so as to seal when the room is retracted. Another set of seals is provided between the stationary opening of the vehicle 110 and the inner ends of the side walls 114, floor 120, and roof 122 to seal against the stationary opening 110 when the room 112 is extended.

Figure 3:
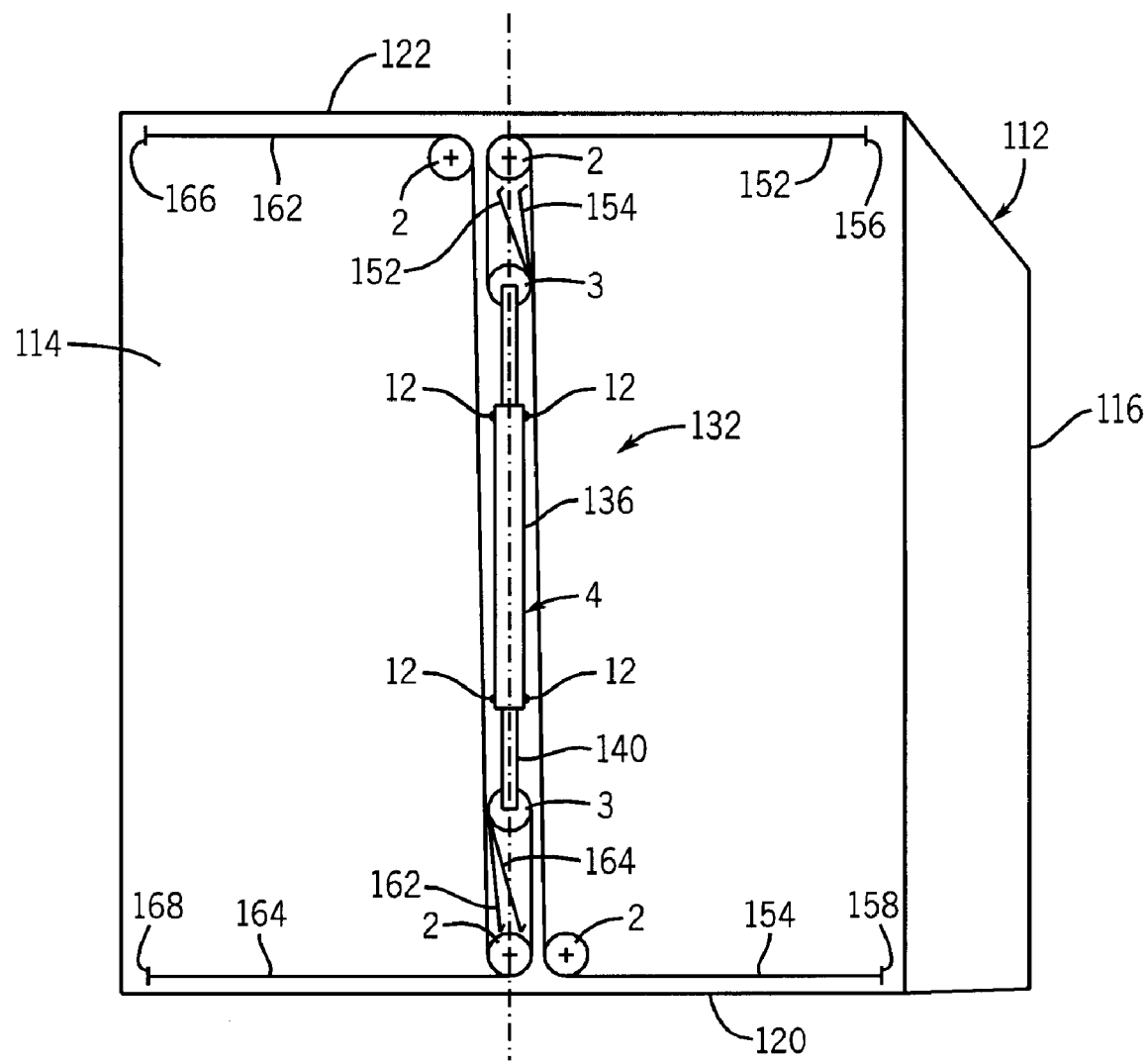
FIG. 3 is a conceptual schematic view illustrating a mechanism of the invention at one side of the slide-out.

Referring to FIG. 3, one side of the mechanism 132 of the invention for extending and retracting the room 112 is illustrated. The mechanism 132 includes a double-acting hydraulic actuator 4 on each side of the section 112. Each actuator 4 includes a cylinder 136 that is fixed to the wall 124 at the corresponding side edge 128 as indicated by points 12, which in practice would be suitable hardware such as a yoke, bolts or other fasteners. As illustrated in FIG. 3, the actuator 4 is fixed to the corresponding side edge 128 in a generally vertical orientation and is positioned within the thickness of the wall 124 so that it is not visible from either the outside of the vehicle or from the inside of the vehicle. Each actuator 4 has a piston rod 140 extending from each end of the cylinder 136 and at each end of the piston rod 140 is rotatably mounted two pulleys 3.

Figure 4:
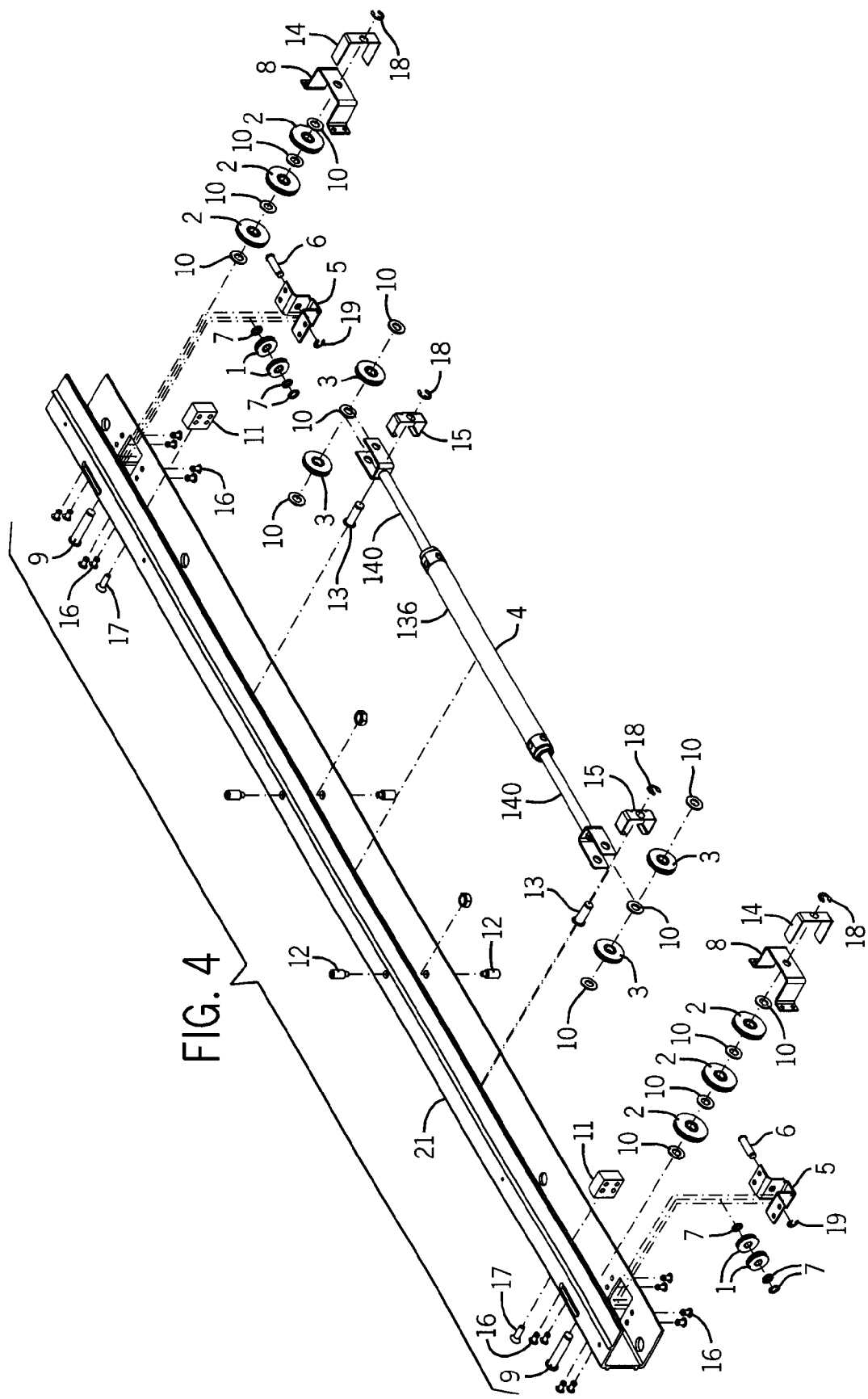
FIG. 4 is an exploded perspective view of a channel assembly for one side of a slide-out mechanism of the invention.

There are a total of four cables on each side of the mechanism 132. A cable 152 and a cable 154 are fixed to the channel 21 at the top by cable adjustment block 11 and suitable fasteners affix the ends of the cables 152 and 154 to the channel 21. Cable 152 runs around one of the two pulleys 3 at the top of the piston rod 140 and cable 154 runs around the other of the two pulleys 3 at the top of piston rod 140. From there, each cable 152 and 154 is routed to run around a different one of two pulleys 2 that are mounted coaxially at the top of the channel 21 on pin 9 (FIG. 4). Suitable spacer washers 10 are provided between the pulleys and the channel and an end bracket 8 and cable retaining bracket 14. An E-clip fixes the pin 9.

It is noted that there are actually three pulleys 2 on the pin 9, two of which are the pulleys 2 on the right in FIG. 3 and one of which is the pulley 2 on the left at the top of FIG. 3. FIG. 3 is drawn to be a schematic depiction to visibly show the cable routing and so the pulley 2 on the left at the top of FIG. 3 is shown off of its physical axis.

From the two pulleys 2 at the top of the channel 21, the two cables 152 and 154 are routed so that one, for example cable 152, goes to the outer top corner of the slide-out section 112 and the other, for example cable 154, goes to the outer lower corner of the section 112. At the upper and lower outer corners, the cables 152 and 154 are fixed to the slide-out section 112, as indicated at point 156 and 158, which would be suitable fasteners for securing the end of the cable to the slide-out section wall.

At the bottom of the mechanism 132, on each side of the slide-out section 112, a cable 162 and a cable 164 are fixed to the channel 21 by a cable adjustment block 11 (FIG. 4) and corresponding pin 9, washers 10, brackets 8 and 14, and clip 18, and are routed around a different one of two pulleys 3 that are rotatably mounted at the lower end of piston rod 140 by a pin 13, washers 10, cable retaining bracket 15, and clip 18. The pulleys 3 are mounted at the top end of the piston rod 140 in a similar manner as indicated in FIG. 4. After being routed around the two pulleys 3 at the bottom of the piston rod 140, the two cables 162 and 164 are each routed around a different one of pulleys 2 coaxially mounted at the bottom of the channel 21 in a manner similar to the pulleys 2 at the top of the channel 21. One of the cables 162 and 164, for example 162, is routed back up and around the third pulley 2, the top of the channel 21, and from there to the upper inside corner of the section 112, and the other of the cables, for example 164, is routed to the lower inside corner of the section 112. The cables 162 and 164 are fixed to the respective upper and lower inside corners of the section 112 at 166 and 168. The third pulley 2 at the bottom of the channel 21 is used to route the cable 154 that runs from the top of the channel 21 down to the bottom of the channel 21 around the third pulley 2 and is fixed at point 158 to the lower outside corner of the slide-out 112 by suitable fasteners.

As stated above, one of the mechanisms shown in FIG. 3 is on each side of the slide-out 112. The major components of each side of the mechanism 132 can be provided as a sub-assembly in the channel 21 with the actuator and all pulleys contained within the sub-assembly, as illustrated in FIG. 4. The sub-assembly in FIG. 4 illustrates the three pulleys 2 at the top of the channel 21 and three at the bottom of the channel 12 all on a common axis, as is preferred. Since two of the cables coming off of the pulleys 2 go in one direction, for example inwardly, and the other one of the three cables coming off of the three pulleys 2 in the other direction, for example outwardly, two pulleys 1 are provided adjacent to the pulleys 2 at each end of the channel 21 so as to change the direction of the two cables that extend in the same direction from the pulleys 2. This prevents those cables from unwinding from the pulleys 2, as is necessary.

Figure 5:
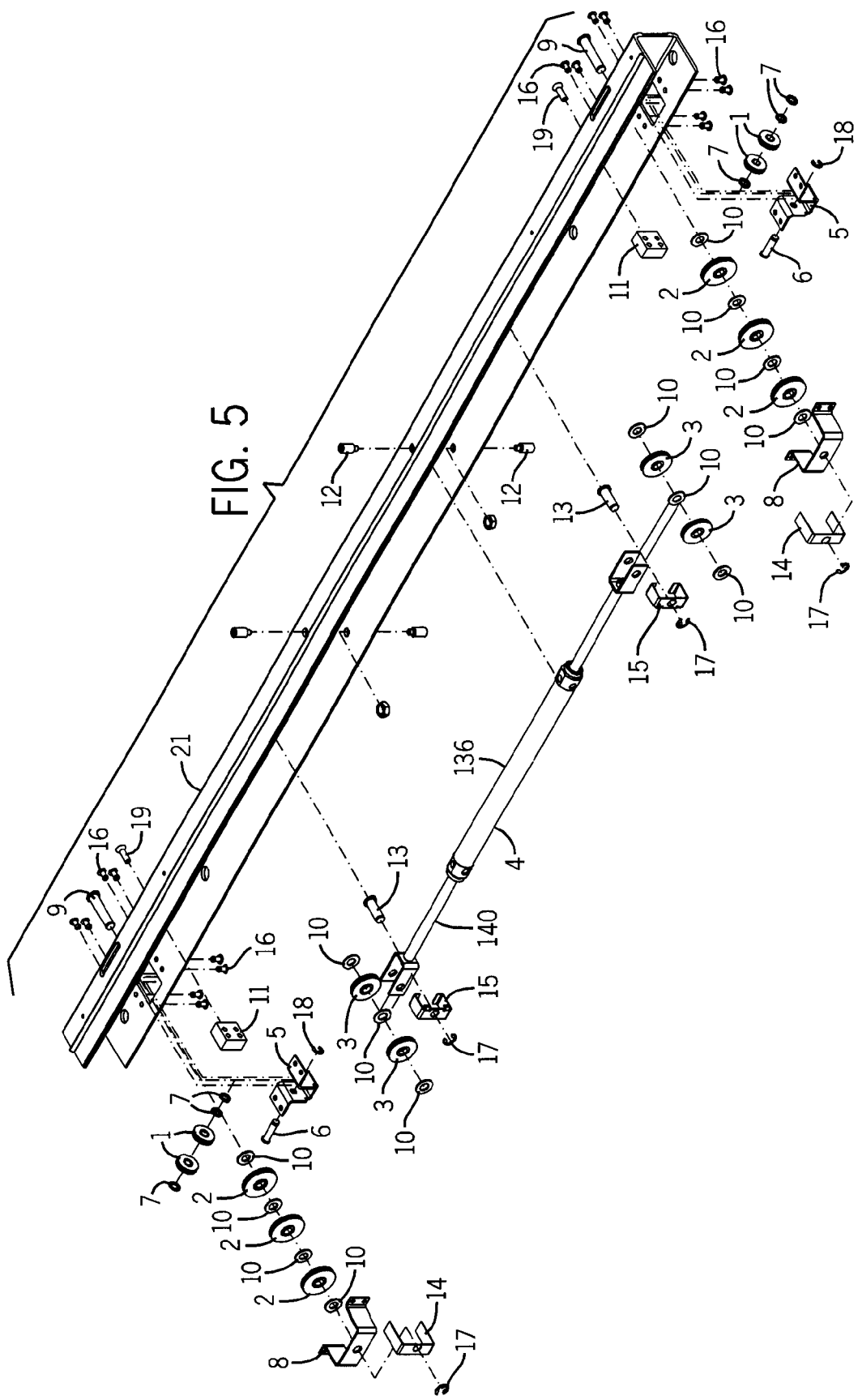
FIG. 5 is a view like FIG. 4, but for the opposite side.

The pulleys 1 at each end of the channel 21 are mounted on a common axis by a pin 6, bracket 5, suitable spacer washers 7, and an E-clip 19, the bracket 5 being assembled to the channel 21 with suitable rivets or other fasteners 16. The brackets 8 are also assembled to the channel 21 using suitable rivets or other fasteners 16, and a screw or other suitable fastener 17 secures the cable adjustment blocks 11 to the channel 21. Set screws 12 with suitable jam nuts or other locking devices secure the cylinder 136 to the channel 21. FIG. 4 illustrates the sub-assembly that would be at one side of the opening 126, the sub-assembly on the opposite side being shown in FIG. 5 and being the mirror image of the sub-assembly shown in FIG. 4.

In the system as illustrated, each unit of stroke of the actuator 136 yields two times as much movement of the slide-out section 112. Thus, for example, for each 12 inches that the piston rod 140 moves, the room 112 moves 24 inches.

In operation, to extend the room, the lower end of the cylinder 136 is pressurized with hydraulic fluid under pressure and the upper end of the cylinder 136 is vented to tank pressure so as to move the piston rod 140 upwardly. This pulls on the two cables 162 and 164 and produces slack in the two cables 152 and 154. The tension produced in the cables 162 and 164 produces a force on the slide-out section at the respective points 166 and 168 that moves the slide-out section 112 outwardly. The slack provided in the cables 152 and 154 permits the section 112 to move outwardly.

This is all accomplished in a controlled manner, maintaining stability of the room 112 as its weight shifts outwardly when being extended or inwardly when being retracted since there is tension on all four cables. Thus, when the room 112 moves so far outwardly that most of its mass is outward of the wall 124, the room would otherwise tend to tip downwardly at its outer end, but because of the counter moment produced on the slide-out section 112 by the cables under tension, that tipping motion is inhibited or prevented so that there is not violent tipping of the room downwardly. When the room is desired to be retracted, the upper end of the cylinder 136 is pressurized and the lower end is vented to tank so as to move the piston rod downwardly, thereby tensioning the cables 152 and 154 and slackening the cables 162 and 164 so as to produce a force on the room 112 that pulls it inwardly while preventing sudden tipping on the way in.

Since there are separate actuators at opposite sides of the room 112, they must be synchronized so that the room does not become skewed in the opening when extending or retracting the room, i.e., both sides of the room must be extended and retracted at the same rate. Synchronization between the hydraulic actuators 4 on the opposite sides of the room can be accomplished using a flow divider circuit to control the flow of hydraulic fluid to and from the actuators 4. Suitable flow divider circuits for controlling and synchronizing the motion of the actuators 4 from side to side are disclosed in U.S. Pat. No. 6,932,403 B2, which is assigned to the assignee of this application. Such circuits disclosed in FIGS. 13, 14, 18, 19, 20, and 21-23, and the description associated with these figures, are hereby incorporated by reference.

Alternatively, the hydraulic actuator 4 could be replaced with a different type of linear actuator, for example, a screw drive. It could be a ball screw or another type of lead screw, or another mechanism capable of translating the pulleys 3 so as to tension one set of cables while slackening the other. For example, if a lead screw is used, the pulleys could be mounted at opposite ends of the screw, and the nut driven, for example, with an electric motor so as to move the screw up and down. Alternatively, the screw could be affixed to a sliding member that mounts the two sets of pulleys, and the screw could be driven to move the nut up and down. The mechanism from side to side could be synchronized using any type of transducer, such as a device to count rotations of the screw or nut or a linear variable displacement transducer to indicate the position of the rod, screw, nut, or other device that moves the pulleys 3, and the two sides would be controlled so as to be extended and retracted at the same rate. Principles of electronic synchronization of slide-outs are known, for example, from patents such as U.S. Pat. Nos. 6,471,275; 6,696,813; and 6,575,514, which teachings of how to synchronize the extension and retraction of two motors and two sides of a slide-out are hereby incorporated by reference.

Note that antifriction means such as rub blocks or rollers can be provided between the floor of the slide-out section and the bottom of the opening or the stationary floor of the vehicle to help support the room and reduce friction as it is being slid in and out.

There has been shown and described preferred embodiments of the invention in considerable detail. It will be apparent to those skilled in the art that various changes and modifications can be made to the preferred embodiment described without departing from the scope of the invention defined by the following claims. Therefore, the invention should not be limited to the embodiments described, but should be defined by the following claims.

I claim:

1. A vehicle having a movable slide-out section received in an opening of a stationary vehicle wall, the opening have sides adjacent to sides of the slide-out section, comprising:
    a mechanism on each side of the opening, each said mechanism including:
        a linear actuator having a stationary portion fixed to the stationary sidewall of the vehicle and a movable portion that is translatable along an axis;
        a first pair of cables, each cable of said first pair being fixed at one end to an upper portion of the stationary sidewall of the vehicle;
        a second pair of cables, each cable of said second pair being fixed at one end to a lower portion of the stationary sidewall of the vehicle;
    wherein the cables and the movable portion of the actuator are in operative relationship so that moving the movable portion of the actuator in one direction pulls on one of the pairs of cables and slackens the other pair and moving the movable portion of the actuator in the opposite direction pulls on the other pair of cables and slackens the one pair;
    wherein one of the pairs of cables is routed to the outside end of the slide-out section and the other of the pairs is routed to the inside end of the slide-out section, with one cable of each pair being routed to an upper portion of the slide-out section and one cable of each pair being routed to a lower portion of the slide-out section; and
    wherein translating the movable portion of the actuators in one direction extends the slide-out section, and translating the movable portion of the actuator in the opposite direction retracts the slide-out section.

2. The improvement of claim 1, wherein the actuator is a hydraulic cylinder.

3. The improvement of claim 1, wherein the slide-out section moves approximately twice as far as the movable portion of the actuator when the movable portion of the actuator is translated.

4. The improvement of claim 1, wherein the actuator is mounted to a channel that is fixed to the stationary sidewall of the vehicle.

5. The improvement of claim 4, wherein pulleys are fixed to each end of the channel around which the cables are routed.

6. The improvement of claim 1, wherein one pair of cables is wrapped at least partially around at least one pulley that is mounted to the movable portion of the actuator and the other pair of cables is wrapped at least partially around at least one different pulley that is mounted to the movable portion of the actuator such that the slide-out section moves further than the movable portion of the actuator moves when the movable portion is moved.

* * * * *